(12) United States Patent
Liu

(10) Patent No.: US 7,792,203 B2
(45) Date of Patent: Sep. 7, 2010

(54) EQUALIZATION METHOD AND APPARATUS FOR TIME DOMAIN SYNCHRONOUS ORTHOGONAL FREQUENCY DIVISION MULTIPLEXING RECEIVER

(75) Inventor: Guanghui Liu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 751 days.

(21) Appl. No.: 11/752,384

(22) Filed: May 23, 2007

(65) Prior Publication Data

US 2008/0137723 A1 Jun. 12, 2008

(30) Foreign Application Priority Data

Dec. 7, 2006 (KR) ...................... 10-2006-0123900

(51) Int. Cl.
*H04L 27/28* (2006.01)
*H04B 1/10* (2006.01)
(52) U.S. Cl. ....................................... 375/260; 375/350
(58) Field of Classification Search ................. 375/229, 375/260, 267, 340, 350
See application file for complete search history.

(56) References Cited

U.S. PATENT DOCUMENTS

2007/0064835 A1* 3/2007 Auranen ..................... 375/316
2008/0013442 A1* 1/2008 Fechtel ....................... 370/203
2008/0109698 A1* 5/2008 Yang et al. .................. 714/758

FOREIGN PATENT DOCUMENTS

| KR | 1020060011758 | 2/2006 |
|----|---------------|--------|
| KR | 1020060071074 | 6/2006 |
| KR | 1020060071084 | 6/2006 |
| WO | WO 2004/006525 | 1/2004 |

* cited by examiner

*Primary Examiner*—Don N Vo
(74) *Attorney, Agent, or Firm*—F.Chau & Associates, LLC

(57) ABSTRACT

An equalization method and apparatus for a Time domain synchronous orthogonal frequency division multiplexing (TDS-OFDM) receiver. The equalization method includes estimating a channel impulse response (CIR) based on a baseband sampled complex signal and locally stored pseudo-noise; eliminating the pseudo-noise from the baseband sampled complex signal based on the CIR; computing channel information including first channel information and second channel information from the CIR; performing pre-fast Fourier transform (FFT) compensation of a pseudo-noise eliminated signal based on the first channel information; performing FFT of a pre-FFT compensated signal; and equalizing a fast Fourier transformed signal based on the second channel information.

28 Claims, 14 Drawing Sheets

EQUALIZATION METHOD AND APPARATUS FOR TIME DOMAIN SYNCHRONOUS ORTHOGONAL FREQUENCY DIVISION MULTIPLEXING RECEIVER

CROSS-REFERENCE TO RELATED PATENT APPLICATION

This application claims the benefit of Korean Patent Application No. 10-2006-0123900, filed on Dec. 7, 2006 in the Korean Intellectual Property Office which is incorporated herein in its entirety by reference.

FIELD OF THE INVENTION

The present invention relates to a time domain synchronous orthogonal frequency division multiplexing (TDS-OFDM) communication system, and more particularly to an equalization method and apparatus for mitigating inter-carrier-interference (ICI) in a TDS-OFDM receiver.

BACKGROUND OF THE INVENTION

Orthogonal frequency division multiplexing (OFDM) is a wideband modulation radio frequency data transmission mode in which a frequency bandwidth allocated for a communication session is divided into a plurality of narrow band frequency sub-bandwidths. Each sub-bandwidth includes a radio frequency (RF) subcarrier. Subcarriers in different sub-channels are mathematically orthogonal to each other.

The orthogonality of the subcarriers allows individual spectrums of the subcarriers to be overlapped without inter-carrier-interference (ICI). Since a frequency bandwidth is divided into a plurality of orthogonal sub-bandwidths, OFDM allows a high data transmission rate and high bandwidth use efficiency.

OFDM is a multi-carrier modulation scheme of converting data to be transmitted into an M-ary quadrature amplitude modulation (QAM) complex symbol, converting a complex symbol sequence into a plurality of parallel complex symbols through serial-to-parallel conversion, and performing rectangular pulse shaping and subcarrier modulation of each parallel complex symbol. In the multi-carrier modulation, a frequency interval between subcarriers is set such that all of the subcarrier modulated parallel complex symbols are orthogonal to each other.

In a case where an M-ary QAM modulation signal is transmitted through a wireless fading channel without using OFDM, if a channel delay spread caused by multipath delay is greater than a symbol period of the modulation signal, inter-symbol interference (ISI) occurs and hinders a receiver from correctly recovering the signal. For this reason, an equalizer that compensates for a random delay spread is typically used in the receiver. However, the equalizer is very complicated to implement and the performance of the receiver is greatly degraded due to input noise.

On the other hand, when OFDM is used, the symbol period of each parallel complex symbol can be expanded to be much longer than the channel delay spread. Accordingly, ISI can be decreased. In particular, when a guard interval is set to be longer than the delay spread, ISI can be completely eliminated. In addition, it is not necessary to implement the equalizer that compensates for a random delay spread caused by multipath delay. Accordingly, OFDM is very effective in data transmission through a wireless fading channel and has been thus adopted as a standard transmission mode for terrestrial digital television (DTV) and audio broadcasting systems in Europe.

Especially, in time-domain synchronous (TDS) OFDM systems, a pseudo-noise (PN) sequence rather than a cyclic prefix (CP) is inserted as a guard interval between inverse discrete Fourier transformed data blocks. Since the PN sequence is also used as a training symbol in an OFDM receiver, higher spectrum efficiency can be obtained in OFDM systems using the PN sequence than in OFDM systems using the CP.

Meanwhile, ICI occurring in a mobile channel causes serious degradation of system performance. The characteristic narrow bandwidth of a subcarrier in an OFDM system is advantageous in overcoming frequency selectivity caused by multipath delay spread but is relatively more sensitive to time selectivity caused by rapid time variation in a mobile channel due to the orthogonality of subcarriers. The time variation may affect the orthogonality of OFDM subcarriers and thus cause ICI.

When a complex modulation symbol vector in a frequency domain is expressed in the form $X=[X_0\ X_1\ \ldots\ X_{N_c-1}]^T$, a baseband complex signal "x" in a time domain may be expressed by Equation (1):

$$x=[x_0\ x_1\ \ldots\ x_{N_c-1}]^T = F^H X \quad (1)$$

where a Fourier transform matrix $$F = (F_{nk})_{N_c \times N_c},$$

$$F_{nk} = \frac{1}{\sqrt{N_c}} e^{-i\frac{2\pi}{N_c}nk},$$

$N_c$ is the size of fast Fourier transform (FFT)/inverse FFT (IFFT), and $[\ ]^T$ denotes a matrix transpose operation and $[\ ]^H$ denotes a conjugate transpose operation.

In addition a channel impulse response (CIR) in a mobile wireless channel may be expressed by Equation (2):

$$h(t,\tau) = \sum_{k=0}^{L-1} \gamma_k(t) \delta(\tau - \tau_k) \quad (2)$$

where $\tau_k$ is a time delay on a k-th path among L paths and $\gamma_k(t)$ is a complex gain. Accordingly, a discrete form corresponding to $h(t,\tau)$ may be expressed by $h[m,l]=h(t=mT_s, \tau=lT_s)$ where $T_s$ is a sampling period.

When a received signal is represented by $y=[y_0\ y_1\ \ldots\ y_{N_c-1}]^T$, a convolution process may be expressed by Equation (3):

$$y_i = h[i,l] * x_l + z_i = \sum_{l=0}^{L-1} h[i,l] x_{i-l} + z_i \quad (3)$$

where "*" indicates a convolution operation, $z$ is a zero mean, and $\sigma^2$ is a Gaussian random variance. The convolution process may be expressed by Equations (4) and (5) in a vector form based on Equation (3).

$$y_0 = [h[0,0]\; 0 \ldots 0\; h[0,L-1] \ldots h[0,1]] \begin{bmatrix} x_0 \\ x_1 \\ \ldots \\ x_{N_c-1} \end{bmatrix} + z_0 = \Theta^{(0)}x + z_0 \quad (4)$$

$$y_1 = [h[1,1]\; h[1,0] \ldots 0\; 0 \ldots h[1,2]] \begin{bmatrix} x_0 \\ x_1 \\ \ldots \\ x_{N_c-1} \end{bmatrix} + z_1 = \Theta^{(1)}x + z_1 \quad (5)$$

where $\Theta^{(0)}=[h[0,0]\; 0 \ldots 0\; h[0,L-1] \ldots h[0,1]]$ and $\Theta^{(1)}=[h[1,1]\; h[1,0] \ldots 0\; 0 \ldots h[1,2]]$ indicates cyclical shift of time-variant $\Theta^{(0)}$.

Accordingly, Equation (3) may be rewritten as Equation (6) in a matrix form:

$$y = AF^H X + z \quad (6)$$

where $A = [\Theta^{(0)}\; \Theta^{(1)} \ldots \Theta^{(N_c-1)}]^T$ and $z = [z_0\; z_1 \ldots z_{N_c-1}]^T$. When a coefficient matrix in Equation (6) is expressed by Equation (7), Equation (8) is obtained.

$$E = AF^H = (E_{pq})_{N_c \times N_c} \quad (7)$$

$$E_{pq} = \frac{1}{\sqrt{N_c}} \sum_{l=0}^{L-1} h[p,l] e^{j\frac{2\pi}{N_c}(p-l)q} \quad (8)$$

Here, since a guard interval is considered in computation, linear convolution is equivalent to cyclic convolution.

When FFT is performed according to Equation (6), a frequency domain demodulation signal can be obtained by Equation (9):

$$Y = Fy = FAF^H X + Z = GX + Z \quad (9)$$

where $Z = Fz$ and a gain matrix is expressed by Equation (10):

$$G = FAF^H = (G_{pq})_{N_c \times N_c} \quad (10)$$

Accordingly, Equation (11) can be obtained:

$$G_{pq} = \frac{1}{\sqrt{N_c}} \sum_{m=0}^{N_c-1} \sum_{l=0}^{L-1} h[m,l] e^{-j\frac{2\pi}{N_c}(p-l)q} \quad (11)$$

When $Y = [Y_0\; Y_1 \ldots Y_{N_c-1}]^T$, Equation (12) is obtained:

$$Y_k = G_{kk} X_k + \underbrace{\sum_{q=0, q \neq k}^{N_c-1} G_{kq} X_q}_{ICI\;term} + Z_k. \quad (12)$$

When a channel is time-invariant, that is; $h[m,l]=h[l]$ in Equation (12), the ICI term becomes 0 in Equation (12) and frequency-selectivity fading can be eliminated using a one-tap equalizer. Conversely, ICI occurs in a mobile channel having a time-variant feature. Influences of ICI on OFDM are introduced by M. Russell and G. L. Stuber ["Interchannel Interference Analysis of OFDM in a Mobile Environment," in Proc. VTC'95, vol. 2, pp. 820-824, July 1995] which is incorporated herein by reference. Accordingly, an equalization method for mitigating ICI is desired.

Meanwhile, it can be inferred from Equation (9) that a signal obtained after equalization is expressed by Equation (13):

$$\hat{X} = G^{-1} Y \quad (13)$$

where $(\;)^{-1}$ is an inverse matrix operation. In other words, an equalizer should perform the inverse matrix operation in order to perform equalization. Here, since complexity of the inverse matrix operation is $O(N_c^3)$ the equalization is very impractical when $N_c$ is large.

SUMMARY OF THE INVENTION

Some aspects of the present invention provide an equalization method and apparatus that mitigate inter-carrier-interference (ICI) with low circuit complexity.

According to some aspects of the present invention, there is provided a time domain synchronous orthogonal frequency division multiplexing (TDS-OFDM) equalization apparatus comprising: a channel information computing unit configured to compute channel information from estimated CIR output from a CIR estimation unit, wherein the channel information computing unit comprises: a pad zero/FFT section configured to pad zeros to the CIR output from the CIR estimation unit and to perform FFT of a zero-padded CIR vector; a delay section configured to delay a fast Fourier transformed CIR vector $\hat{H}_n$ output from the pad zero/FFT section by a single OFDM symbol period and to output a delayed vector $\hat{H}_c$; and at least one first operation section configured to compute $$H_a = \frac{1}{2}(\hat{H}_n + \hat{H}_c),\; H_d = \frac{1}{2}(\hat{H}_n + \hat{H}_c),$$

and $H_b[k] = H_d[k]/H_a[k]$ based on the vectors $\hat{H}_n$ and $\hat{H}_c$.

The equalization apparatus typically comprises a correlator configured to compute a correlation signal indicating the correlation between a baseband-sampled complex signal and locally stored pseudo-noise and to output the correlation signal; and a channel impulse response (CIR) estimation unit configured to estimate the CIR based on the correlation signal output from the correlator.

The equalization apparatus may further comprising a pre-fast Fourier transform (FFT) unit configured to perform pre-FFT compensation of a pseudo-noise eliminated signal y, which is obtained by eliminating the pseudo-noise from the baseband sampled complex signal based on the CIR output from the CIR estimation unit, based on first channel information output from the channel information computing unit; a first FFT unit configured to perform FFT of a pre-FFT compensated signal output from the pre-FFT unit; and an equalizer configured to equalize a fast Fourier transformed signal Y, which is output from the first FFT unit, based on second channel information output from the channel information computing unit.

According to some aspects of the present invention, there is provided an equalization method for a time domain synchronous orthogonal frequency division multiplexing (TDS-OFDM) receiver. The equalization method includes estimating a channel impulse response (CIR) based on a baseband sampled complex signal and locally stored pseudo-noise (PN); computing channel information including first channel information and second channel information based on the estimated CIR; performing pre-fast Fourier transform (FFT) compensation of a PN eliminated signal y, which is obtained by eliminating the PN from the baseband sampled complex signal based on the CIR, based on the first channel information: performing FFT of a pre-FFT compensated signal; and equalizing a fast Fourier transformed signal Y based on the second channel information.

The first channel information may be a normalized channel transfer function $H_b$ and the second channel information may be an average channel transfer function $H_a$.

Computing the channel information may include padding zeros to the CIR and performing FFT of a zero-padded CIR vector; and computing the second channel information using $$H_a = \frac{1}{2}(\hat{H}_n + \hat{H}_c),$$

where $\hat{H}_n$ is a fast Fourier transformed CIR vector and $\hat{H}_c$ is a vector obtained by delaying the fast Fourier transformed CIR vector $\hat{H}_n$ by a single OFDM symbol period.

Computing the channel information may further include computing a channel transfer function deviation vector using $$H_d = \frac{1}{2}(\hat{H}_n - \hat{H}_c),$$

and computing a vector of the normalized channel transfer function $H_b$ corresponding to the first channel information using $H_b[k]=H_d[k]/H_a[k]$.

Estimating the CIR may include estimating the CIR using linear approximation based on at least two gain values.

The at least two gain values may respectively correspond to centers of two respective guard intervals adjacent to an OFDM block.

Performing the pre-FFT compensation may include performing Q time time-frequency-time (T-F-T) processes where Q is 0 or an integer greater than 0, and adding the PN eliminated signal y and each results of the respective Q time T-F-T processes.

Performing each T-F-T process may include performing FFT of a input signal, multiplying the result of performing the FFT of the input signal by a normalized channel transfer function Hb, performing inverse FFT (IFFT) of the result of the multiplication; and outputting a output signal by multiplying the result of the IFFT by a CIR slope vector λ, where the input signal of first T-F-T process is the pseudo-noise eliminated signal y and the input signal of N-th T-F-T process is the output signal of (N−1)-th T-F-T process, where N is integer greater than 0 and no greater than Q.

Alternatively, performing the pre-FFT compensation may include performing IFFT of a normalized channel transfer function $H_b$, performing convolution filtering of the PN eliminated signal y using the normalized channel transfer function $H_b$, as a coefficient, and multiplying the result of the convolution filtering by a CIR slope vector λ and adding the result of the multiplication and the PN eliminated signal y.

The equalization method may further include performing post-FFT compensation of the fast Fourier transformed signal Y when Q is 0, wherein equalizing the fast Fourier transformed signal Y comprises equalizing the result of the post-FFT compensation based on the second channel information.

Performing the post-FFT compensation may include multiplying the fast Fourier transformed signal Y by the normalized channel transfer function $H_b$; performing convolution filtering of the result of the multiplication of the signal Y and the function $H_b$ using a signal Ξ, which is the result of performing FFT of a CIR slope vector λ, as a coefficient; and adding the result of the convolution filtering and the fast Fourier transformed signal Y.

Performing the convolution filtering may include inserting a cyclic extension (CE) into an input signal, performing linear convolution of a CE inserted signal based on the coefficient and removing the CE from the result of the linear convolution.

Performing the convolution filtering may further include cyclically shifting the result of the linear convolution to correct a phase of the result of the linear convolution according to a phase of a frequency-domain signal.

According to other embodiments of the present invention, there is provided a TDS-OFDM equalization apparatus including a correlator configured to compute a correlation signal based on a baseband sampled complex signal and local PN and outputting the correlation signal; a CIR estimation unit configured to estimate a CIR based on the correlation signal output from the correlator; a channel information computing unit configured to compute channel information including first channel information and second channel information from an estimated CIR output from the CIR estimation unit; a pre-FFT unit configured to perform pre-FFT compensation of a PN eliminated signal y, which is obtained by eliminating the PN from the baseband sampled complex signal based on the CIR output from the CIR estimation unit, based on the first channel information output from the channel information computing unit; a first FFT unit configured to perform FFT of a pre-FFT compensated signal output from the pre-FFT unit; and an equalizer configured to equalize a fast Fourier transformed signal Y, which is output from the first FFT unit, based on the second channel information output from the channel information computing unit.

The TDS-OFDM equalization apparatus may further include a PN eliminator configured to output the PN eliminated signal y to the pre-FET unit based on the baseband sampled complex signal and the CIR output from the CIR estimation unit.

The channel information computing unit may include a pad zero/FFT section configured to pad zeros to the CIR output from the CIR estimation unit and to perform FFT of a zero-padded CIR vector; a delay section configured to delay a fast Fourier transformed CIR vector $\hat{H}_n$ output from the pad zero/FFT section by a single OFDM symbol period and to output a delayed vector $\hat{H}_c$; and at least one first operation section configured to compute $$H_a = \frac{1}{2}(\hat{H}_n + \hat{H}_c),$$

$$H_d = \frac{1}{2}(\hat{H}_n - \hat{H}_c),$$

and $H_b[k]=H_d[k]/H_a[k]$ based on the vectors $\hat{H}_n$ and $\hat{H}_c$.

The CIR estimation unit may receive the correlation signal output from the correlator and estimate the CIR using linear approximation based on the correlation signal and at least two gain values.

Two of the at least two gain values may respectively correspond to centers of two respective guard intervals adjacent to an OFDM block.

The pre-FFT unit may include at least one T-F-T processor, and a second operating section (comprising an adder) configured to add the PN eliminated signal y output from the PN eliminator and a signal output from the at least one T-F-T processor.

The at least one T-F-T processor may include a second FFT unit configured to perform FFT of an input signal, a first multiplier configured to multiply a fast Fourier transformed signal output from the second FFT unit by the first channel information output from the channel information computing unit, an IFFT unit configured to perform IFFT of the result of the multiplication, and a second multiplier configured to multiply an inverse fast Fourier transformed signal by a CIR slope vector $\lambda$.

Alternatively, the pre-FFT unit may include an IFFT section configured to perform IFFT of a normalized channel transfer function $H_b$ output from the channel information computing unit, a convolution filter configured to perform convolution filtering of the PN eliminated signal y output from the PN eliminator using an inverse fast Fourier converted $H_b$ as a coefficient, and at least one operating section configured to multiply a signal output from the convolution filter by a CIR slope vector $\lambda$ and to add the result of the multiplication and the PN eliminated signal y.

The TDS-OFDM equalization apparatus may further include a post-FFT unit configured to perform post-FFT compensation of the fast Fourier transformed signal Y output from the first FFT unit, wherein the equalizer equalizes a signal output from the post-FFT unit based on the second channel information.

The post-FFT unit may include a first operating section (e.g. comprising a multiplier) configured to multiply the fast Fourier transformed signal Y output from the first FFT unit by a normalized channel transfer function $H_b$; a convolution filter configured to perform convolution filtering of a signal output from the first operating section using a signal $\Xi$, which is the result of performing FFT of a CIR slope vector $\lambda$, as a coefficient; and a second operating section (e.g. comprising an adder) configured to add a signal output from the convolution filter and the fast Fourier transformed signal Y output from the first FFT unit.

The convolution filter may include a cyclic extension (CE) inserter configured to insert a CE into an input signal, a linear convolution section configured to perform linear convolution of a CE inserted signal output from the CE inserter based on the coefficient, and a CE remover configured to remove the CE from a signal output from the linear convolution section.

The CE remover may cyclically shift the signal output from the linear convolution section to correct a phase of the signal output from the linear convolution section according to a phase of a frequency-domain signal.

The TDS-OFDM equalization apparatus may further include a forward error correction (FEC) unit configured to perform FEC with respect to a signal output from the equalizer. The TDS-OFDM equalization apparatus may be included in a TDS-OFDM receiver.

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout.

It will be understood that, although the terms first, second, etc. may be used herein to describe various elements, these elements should not be limited by these terms. These terms are only used to distinguish one element from another. For example, a first signal could be termed a second signal and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF EXEMPLARY EMBODIMENTS OF THE INVENTION

Figure 1:
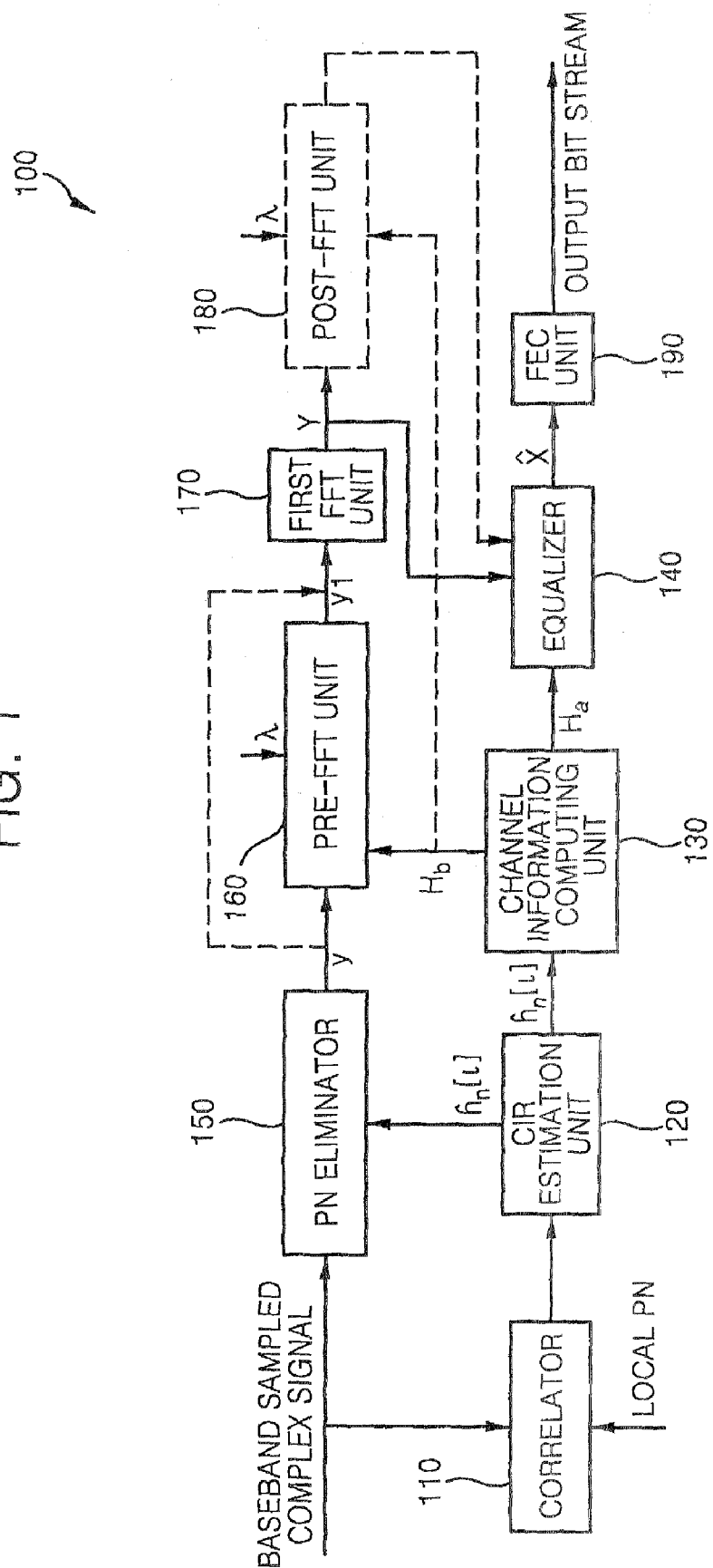
FIG. 1 is a functional diagram of a time domain synchronous orthogonal frequency division multiplexing (TDS-OFDM) equalization apparatus according to an embodiment of the present invention.

FIG. 1 is a functional diagram of a time domain synchronous orthogonal frequency division multiplexing (TDS-OFDM) equalization apparatus 100 according to an embodiment of the present invention. The TDS-OFDM equalization apparatus 100 includes a correlator 110, a channel impulse response (CIR) estimation unit 120, a channel information computing unit 130, an equalizer 140, a pre-fast Fourier transform (FFT) unit 160, and a first FFT unit 170. The TDS-OFDM equalization apparatus 100 may further include at least one among a PN (PN) eliminator 150, a post-FFT unit 180, and a forward error correction (FEC) unit 190. The TDS-OFDM equalization apparatus 100 may be included in a TDS-OFDM receiver.

The correlator 110 computes a correlation signal based on a baseband sampled complex signal and a local PN and outputs the correlation signal to the CIR estimation unit 120. The baseband sampled complex signal may be generated by sampling a received analog signal with a predetermined frequency and compensating for a frequency offset and a sub-carrier frequency offset included in a digital signal obtained as a result of the sampling.

The CIR estimation unit 120 estimates a CIR based on the correlation signal output from the correlator 110. The CIR estimation unit 120 estimates the CIR on the assumption that the CIR changes linearly during an OFDM block period in order to compensate for the inter-carrier-interference (ICI) term in Equation (12). In other words, the CIR estimation unit 120 receives a signal output from the correlator 110 and estimates the CIR using linear approximation based on the received signal and at least two gain values.

Figure 2:
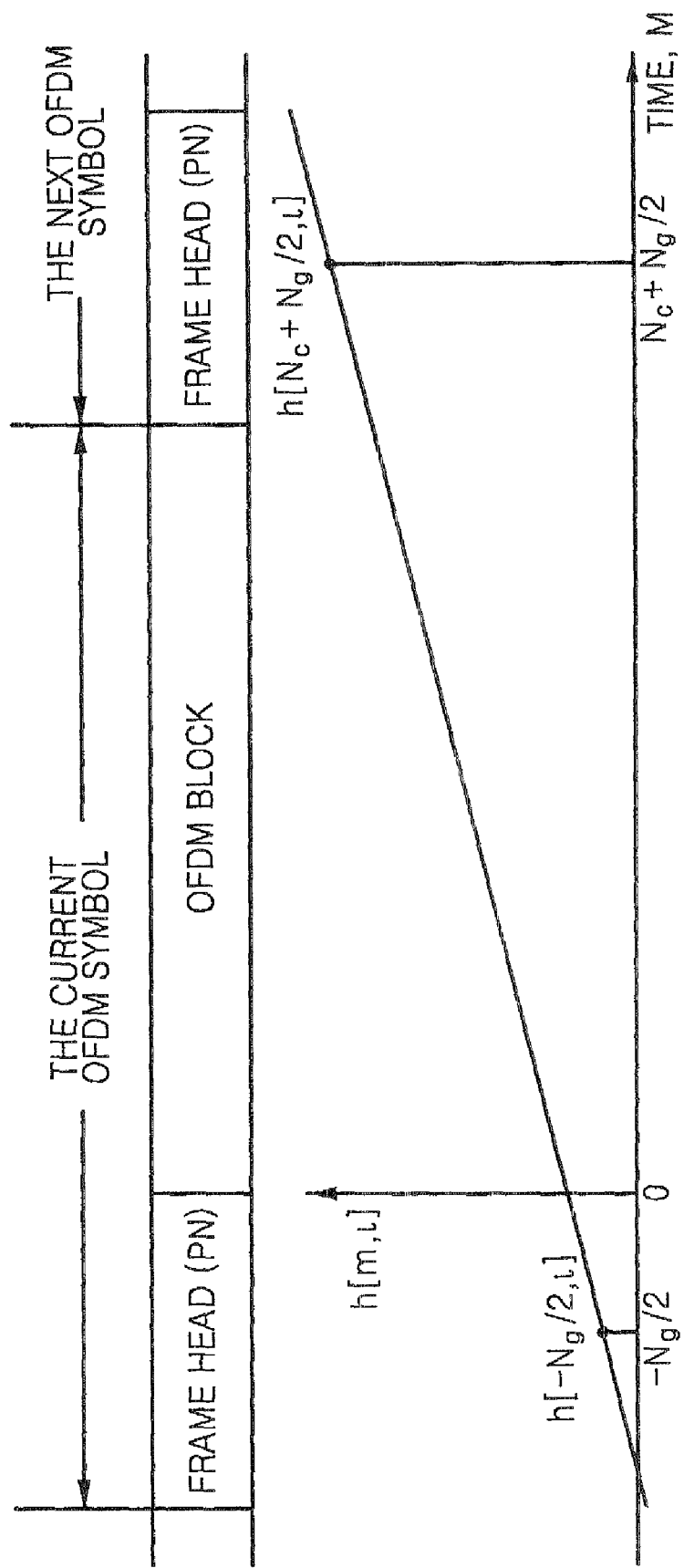
FIG. 2 illustrates an OFDM block and a method of estimating a channel impulse response (CIR) in the OFDM block using linear approximation, according to an embodiment of the present invention.

FIG. 2 illustrates an OFDM block and a method of estimating a CIR in the OFDM block using linear approximation, according to some embodiments of the present invention. A graph shown in FIG. 2 illustrates a linearized CIR h[m,l], l= 0, . . . , L−1 with respect to time m. When m=−$N_g$/2 and m=$N_c$+$N_g$/2, the CIR becomes h[−$N_g$/2,l] and h[$N_c$+$N_g$/2,l], respectively. Here, $N_g$ indicates the length of a frame head (or guard interval), and m=0, 1, . . . , $N_c$−1. Accordingly, the CIR is expressed by Equation (14):

$$h[m, l] = h[-N_g/2, l] + \frac{h[N_c + N_g/2, l] - h[-N_g/2, l]}{N_c + N_g}\left(m + \frac{N_g}{2}\right) \quad (14)$$

$$= h_a[l] - \lambda_m h_d[l]$$

where $N_g$ indicates the length of a frame head and the arguments in simplified Equation (14) are defined in Equations (15) as follows:

$$\begin{cases} h_a[l] = \frac{h[N_c + N_g/2, l] + h[-N_g/2, l]}{2} \\ h_d[l] = \frac{h[N_c + N_g/2, l] + h[-N_g/2, l]}{2} \\ \lambda_m = 1 - \frac{m + N_g/2}{(N_c + N_g)/2} \end{cases} \quad (15)$$

In addition, when signals obtained by performing discrete Fourier transform (DFT) of zero-padded $h_a[l]$ and $h_d[l]$ are represented by $H_a[k]$ and $H_d[k]$, respectively, a normalized channel transfer function of $H_b[k]=H_d[k]/H_a[k]$ can be obtained where k=0, 1, . . . , $N_c$−1.

Since $N_g$ is very small compared to $N_c$ in Equation (14), an assumption can be made that the CIR does not change in the frame head (or a guard interval). Accordingly, when $\hat{h}_c[l]$ and $\hat{h}_n[l]$ are respectively defined as a current symbol's CIR estimation and a subsequent symbol's CIR estimation, Equation (16) can be obtained:

$$\begin{cases} h[-N_g/2, l] = \hat{h}_c[l] \\ h[N_c + N_g/2, l] = \hat{h}_n[l]. \end{cases} \quad (16)$$

According to Equation (16), a CIR estimation may be considered as a CIR at the center of a frame head (or guard interval). Since the CIR estimation obtained based on the correlation of PN is an ideal average of a CIR in the frame head, a CIR value obtained at the center may be considered as an average of the CIR in the linearized CIR estimating method illustrated in FIG. 2. Therefore, gain values respectively corresponding to centers of respective two guard intervals adjacent to the OFDM block may be used as the at least two gain values needed in the CIR estimating method using the linear approximation.

The channel information computing unit 130 computes channel information including first channel information and second channel information from the estimated CIR $\hat{h}_n[l]$ output from the CIR estimation unit 120. The process used by the channel information computing unit 130 to compute the first channel information and the second channel information will be described with reference to FIG. 3 below.

Figure 3:
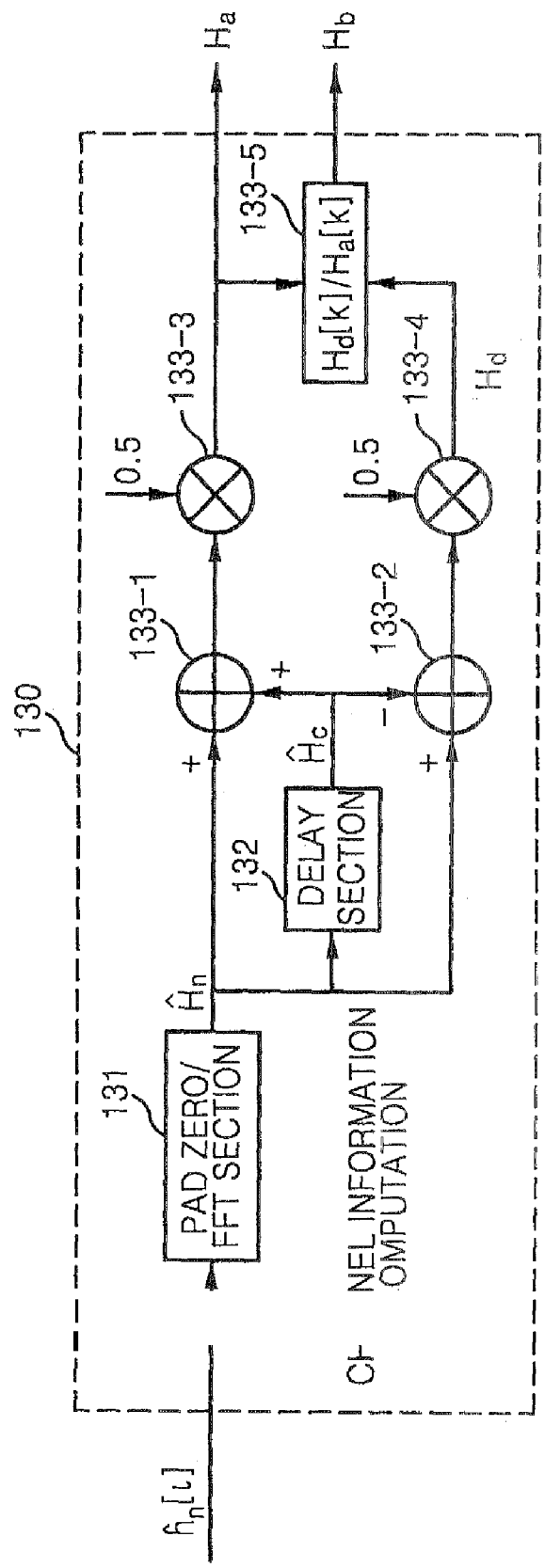
FIG. 3 is a functional block diagram of a channel information computing unit according to an embodiment of the present invention.

FIG. 3 is a functional block diagram of the channel information computing unit 130 according to an embodiment of the present invention. Referring to FIGS. 1 and 3, the channel information computing unit 130 may include a pad zero/FFT section 131, a delay section 132, and one or more operation sections 133-1 through 133-5.

The pad zero/FFT section 131 pads zeros in the estimated CIR $\hat{h}_n[l]$ output from the CIR estimation unit 120, performs FFT of a zero-padded CIR vector, and outputs a signal $\hat{H}_n$, which becomes a channel transfer function (CTF).

The delay section 132 delays the fast Fourier transformed CIR vector $\hat{H}_n$ output from the pad zero/FFT section 131 by a single OFDM symbol period and outputs a delayed vector $\hat{H}_c$.

The operating sections 133-1 through 133-5 compute $$H_a = \frac{1}{2}(\hat{H}_n + \hat{H}_c),$$

$$H_d = \frac{1}{2}(\hat{H}_n + \hat{H}_c),$$

and $H_b[k]=H_d[k]/H_a[k]$ based on the vectors $\hat{H}_n$ and $\hat{H}_c$. The operating sections (adders and/or subtractors, and multipliers) 133-1 through 133-5 may be arranged as in the structure illustrated in FIG. 3, any other arrangements allowing the computation of $$H_a = \frac{1}{2}(\hat{H}_n + \hat{H}_c), H_d = \frac{1}{2}(\hat{H}_n - \hat{H}_c),$$

and $H_b[k]=H_d[k]/H_a[k]$ can be used.

Referring back to FIG. 1, the pre-FFT 160 performs pre-FFT compensation on a signal "y", (which is a result of eliminating PN from the baseband sampled complex signal based on the estimated CIR $\hat{h}_n[l]$ output from the CIR estimation unit 120), based on the first channel information $H_b$ output from the channel information computing unit 130. The vector $H_a$ is an average channel transfer function and vector $H_b$ is a normalized channel transfer function (CTF).

The TDS-OFDM equalization apparatus 100 may further include the PN eliminator 150 to eliminate PN from the baseband sampled complex signal based on the estimated CIR $\hat{h}_n[l]$. The PN eliminator 150 eliminates PN from the baseband sampled complex signal based on the estimated CIR $\hat{h}_n[l]$ output from the CIR estimation unit 120 and outputs the PN-eliminated signal "y" to the pre-FFT unit 160.

The pre-FFT compensation performed by the pre-FFT unit 160 is further described as follows:

When Equation (14) is applied to Equation (8), Equation (17) is obtained:

$$E_{pq} = \frac{1}{\sqrt{N_c}} \sum_{l=0}^{L-1} h_a[l] e^{j\frac{2\pi}{N_c}(p-1)q} - \frac{\lambda_p}{\sqrt{N_c}} \sum_{l=0}^{L-1} h_d[l] e^{j\frac{2\pi}{N_c}(p-1)q} \quad (17)$$

Equation (17) can be rewritten in a matrix form as Equation (18):

$$E = F^H M - \Lambda F^H D \quad (18)$$

Here, $M=\text{diag}(H_a)$, $\Lambda=\text{diag}(\lambda)$, $D=\text{diag}(H_d)$, $H_a=[H_a[0]\ H_a[1]\ \ldots\ H_a[N_c-1]]^T$, $H_d=[H_d[0]\ H_d[1]\ \ldots\ H_d[N_c-1]]^T$, $\lambda=[\lambda_0\ \lambda_1\ \ldots\ \lambda_{N_c-1}]^T$, and $\text{diag}(V)$ is a diagonal matrix of a diagonal vector V. In addition, $H_a$ and $H_d$ are respectively the average and the deviation of the CTF.

Equation (19) can be obtained from Equations (6) and (18):

$$\begin{aligned} y &= (F^H M - \Lambda F^H D)X + z \quad (19) \\ &= (I - \Lambda F^H BF)F^H MX + z \\ &= (I - W)y_1 + z \end{aligned}$$

where $y_1 = F^H MX$, $W = \Lambda F^H BF$, $B = DM^{-1} = \text{diag}(H_b)$, and $H_b = [H_b[0]\ H_b[1]\ \ldots\ H_b[N_c-1]]^T$. The vector $H_b$ a normalized CTF. Accordingly when the pre-FFT compensation is performed, Equation (20) is obtained:

$$\hat{y}_1 = (I-W)^{-1} y \quad (20)$$

When the eigenvalue $\zeta_i$ of W in Equation (20) satisfies Equation (21), Equation (22) can be obtained.

$$|\zeta_i| < 1 \text{ for } i=0, 1, \ldots, N_c-1 \quad (21)$$

$$(I - W)^{-1} = \sum_{i=0}^{\infty} W^i \quad (22)$$

A method of obtaining Equation (22) is disclosed in "Matrix Analysis and Applied Linear Algebra" [Carol D, Meyer, Cambridge Univ. Press, 2001], which is incorporated herein by reference.

When higher-order components of a Neumann series are discarded in Equation (22), a Q-th order approximate value is defined as Equation (23):

$$(I - W)^{-1} \approx \sum_{i=0}^{Q} W^i \quad (23)$$

From Equations (20) and (23), Equation (24) for a channel equalization apparatus with low complexity can be obtained:

$$\hat{X} = M^{-1} F \left( \sum_{i=0}^{Q} W^i y \right) \quad (24)$$

It can be inferred from Equation (24) that the PN-eliminated signal "y" is compensated for $$\sum_{i=0}^{Q} W^i y$$

in a time domain. In addition, after the compensation, one-tap equalization is performed in a frequency domain based on an average CTF $H_a[k]$.

While the conventional equalization methods are based on Equation (13), an equalization method according to various embodiments of the present invention are based on Equation (24). In Equation (13), $G^{-1}$ is computed with a complexity of $o(N_c^3)$. However, in Equation (24), $M^{-1}$ is computed with a complexity of $o(N_c)$ since M is a diagonal matrix. In addition, since $$\sum_{i=0}^{Q} W^i y$$

is performed before the equalizer 140 performs equalization, the PN-eliminated signal "y" is compensated for $$\sum_{i=0}^{Q} W^i y$$

in the time domain.

Figure 4:
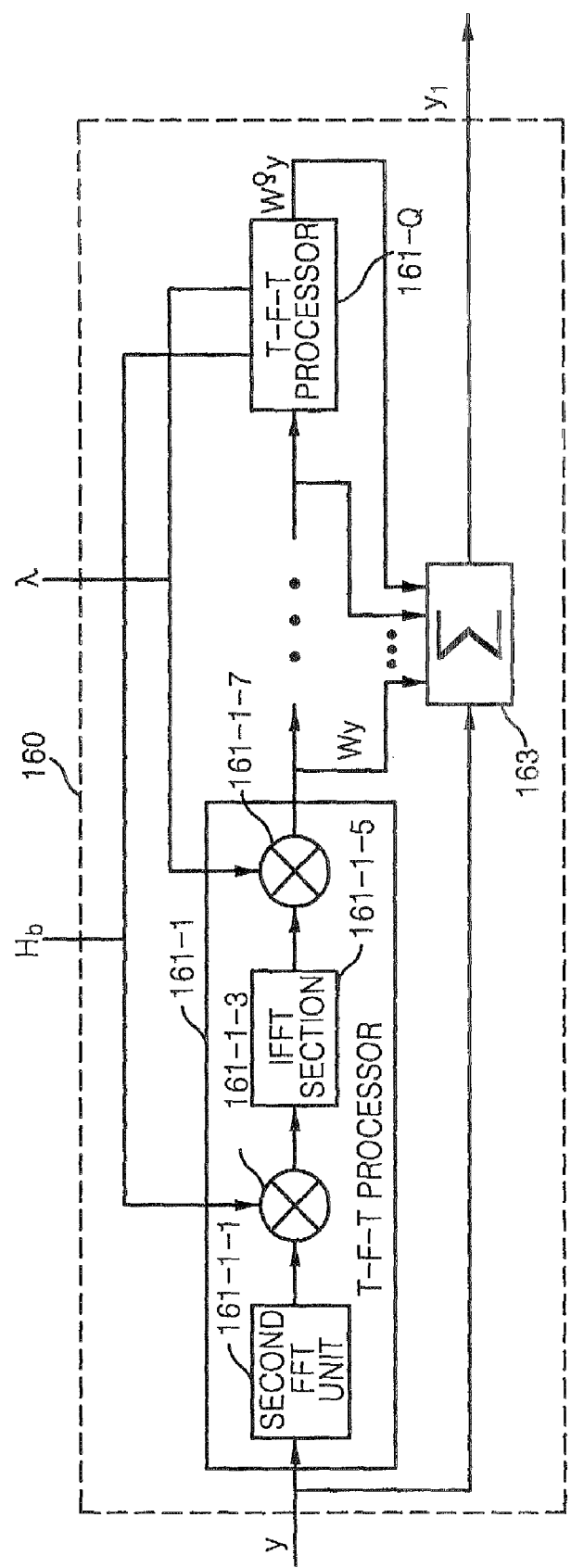
FIG. 4 is a functional block diagram of a pre-fast Fourier transform (FFT) unit according to an embodiment of the present invention.

FIG. 4 is a functional block diagram of the pre-FFT unit 160 according to an embodiment of the present invention. Referring to FIGS. 1 and 4, the pre-FFT unit 160 may include one or a plurality of time-frequency-time (T-F-T) processors 161-1 through 161-Q (e.g., 161-1 and 161-Q) and a second operating section 163.

Each of the T-F-T processors 161-1 through 161-Q may include a second FFT unit 161-1-1, a first multiplier 161-1-3 an inverse FFT (IFFT) section 161-1-5, and a second multiplier 161-1-7. Each of the T-F-T processors 161-1 through 161-Q outputs a signal which is a result of multiplying an input signal by the matrix W. Each of the T-F-T processors 161-1 through 161-Q operate in the same or in similar manners. Thus, the first T-F-T processor 161-1 will be described as representative of each of the T-F-T processors 161-1 through 161-Q.

The second FFT unit 161-1-1 performs FFT of the input signal. In other words, each of second FFT units 161-1-1 through 161-Q-1 (in T-F-T processors 161-Q) receives an output signal of its previous T-F-T processor as the input signal. The input signal of the first T-F-T processor 161-1 is the signal "y" output from the PN eliminator 150. The first multiplier 161-1-3 multiplies a fast Fourier transformed signal output from the second FFT unit 161-1-1 by the first channel information $H_h$ (i.e., the normalized CTF) output from the channel information computing unit 130. The IFFT section 161-1-5 performs IFFT of a signal resulting from the multiplication performed by the first multiplier 161-1-3. The second multiplier 161-1-7 multiplies the inverse fast Fourier transformed signal by a CIR slope vector λ and outputs the result of that multiplication as an output signal Wy.

The first channel information (i.e., the normalized CTF $H_b$) output from the channel information computing unit 130 is input to the individual T-F-T processors 161-1 through 161-0 and the CIR slope vector λ may be input to the individual T-F-T processors 161-1 through 161-Q as another input signal. As is described above with reference to FIG. 2, the CIR slope vector λ has a constant value when the linear approximation is used.

The pre-FFT unit 160 needs Q T-F-T processors (where Q is 0 or an integer greater than 0) for Q-th order compensation, e.g., for compensation of $$\sum_{i=0}^{Q} W^i y.$$

According to the results of simulation which will be described later. Q=1 provides satisfactory performance.

The second operating section 163 adds together the PN-eliminated signal "y" output from the PN eliminator 150 and the output signals of the T-F-T processors 161-1 through 161-Q.

Referring back to FIG. 1, the first FFT unit 170 performs FFT of a pre-FFT compensated signal $y_1$ output from the pre-FFT unit 160. In other words, the first FFT unit 170 converts the pre-FFT compensated signal $y_1$ into the frequency domain.

The equalizer 140 equalizes a fast Fourier transformed signal Y output from the first FFT unit 170 based on the second channel information output from the channel information computing unit 130. In other words, the equalizer 140 receives the signal Y output from the first FFT unit 170 and the average CTF $H_a$ output from the channel information computing unit 130 and equalizes the signal Y based on Equation 25.

$$\hat{X}[k]=Y[k]/H_a[k] \quad (25)$$

where $\hat{X}[k]$ is a k-th entry of $\hat{X}$.

The TDS-OFDM equalization apparatus 100 may further include the post-FFT unit 180 to perform post-FFT compensation of the signal Y output from the first FFT unit 170. In alternative embodiments, the TDS-OFDM equalization apparatus 100 may perform compensation using only one of the pre-FFT unit 160 and the post-FFT unit 180. When the compensation is performed using the post-FFT unit 180, the pre-FFT unit 160 may not perform the compensation. In this case, Q will be 0.

When the compensation is performed using the post-FFT unit 180, the equalizer 140 equalizes a signal $Y_1$ output from the post-FFT unit 180 based on the second channel information.

Figure 5:
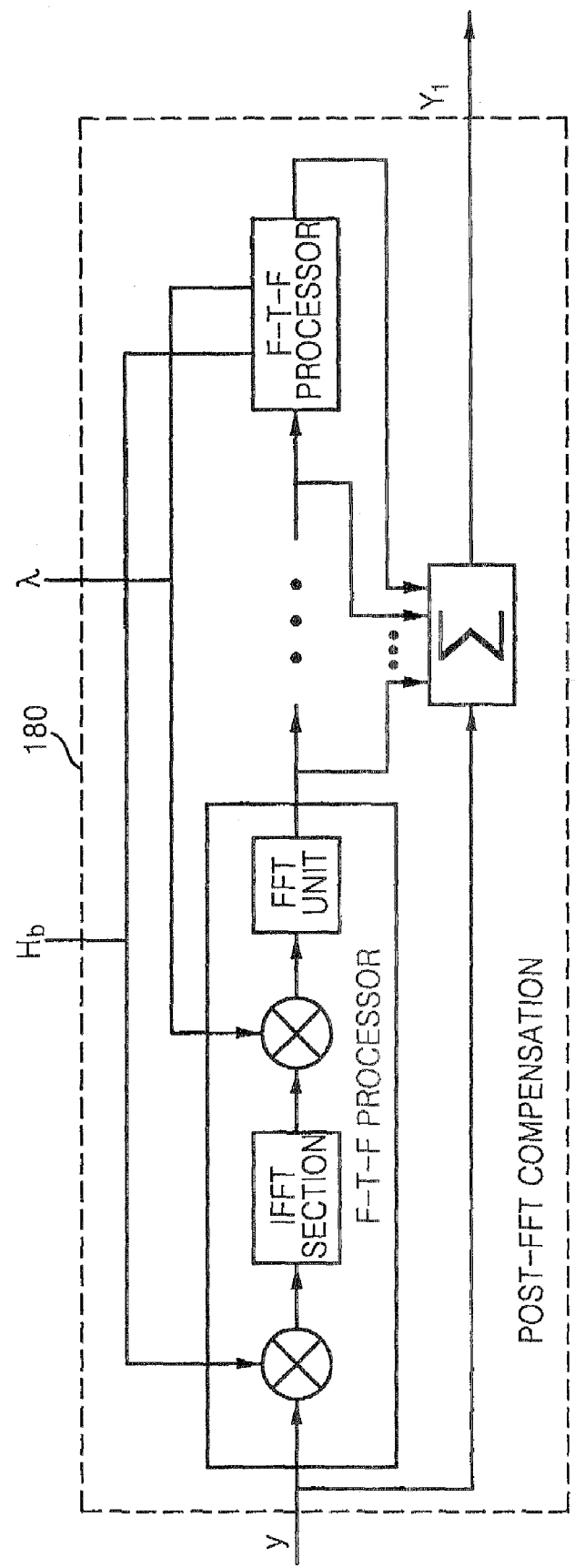
FIG. 5 is a functional block diagram of a post-FFT unit according to an embodiment of the present invention.

FIG. 5 is a functional block diagram of the post-FFT unit 180 according to some embodiments of the present invention. Referring to FIG. 5, the post-FFT unit 180 has a very similar structure to that of the pre-FFT unit 160 illustrated in FIG. 4. While the pre-FFT unit 160 performs the compensation based on Equation (24), the post-FFT unit 180 performs the compensation based on a frequency-domain version of Equation (24), i.e., Equation (26):

$$\hat{X} = M^{-1}\left(\sum_{t=0}^{Q}(F\Lambda F^H B)^t Y\right). \quad (26)$$

In the post-FFT unit 180, the T-F-T processor in the pre-FET unit 160 is replaced by an F-T-F (frequency-time-frequency) processor. The post-FFT unit 180 illustrated in FIG. 5 is disclosed in [J. Fu, C. Y. Pan, Z. X. Yang, and L. Yang, "Low-Complexity Equalization for TDS-OFDM Systems over Doubly Selective Channels," IEEE Trans. Broadcast., vol. 51, no. 3, pp. 401-407, September 2005] which is incorporated herein by reference. The performance and the complexity of the post-FFT compensation illustrated in FIG. 5 are the same as that of the pre-FFT compensation illustrated in FIG. 4.

Figure 6:
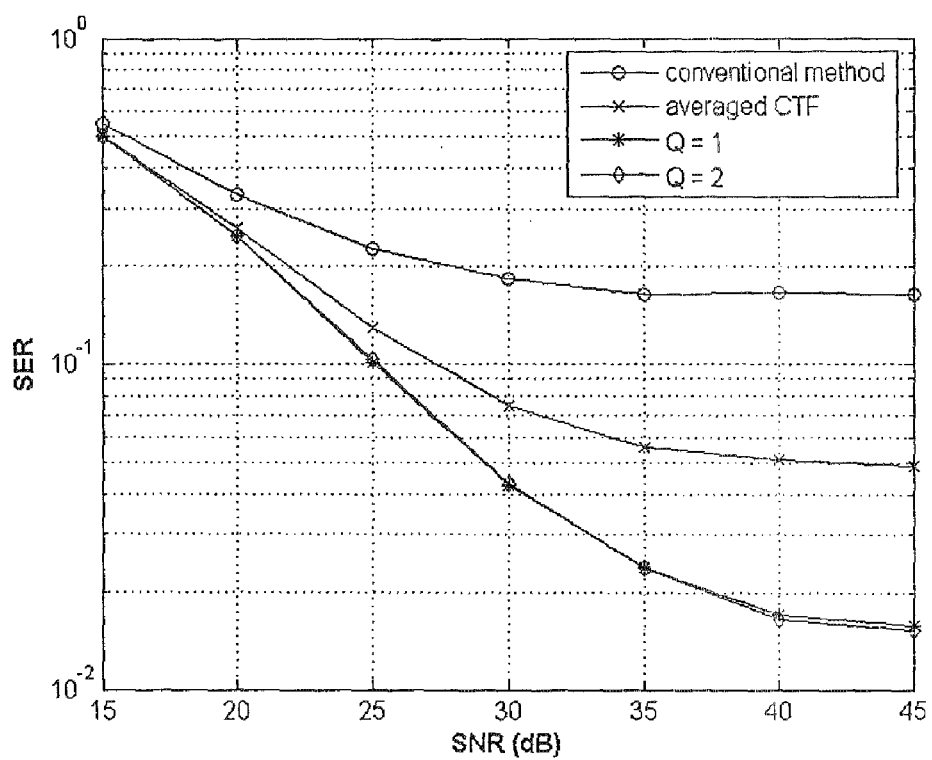
FIG. 6 is a graph illustrating the results of simulating a symbol error rate (SER) of an equalization apparatus according to some embodiments of the present invention when a Doppler shift frequency is 60 Hz.
Figure 7:
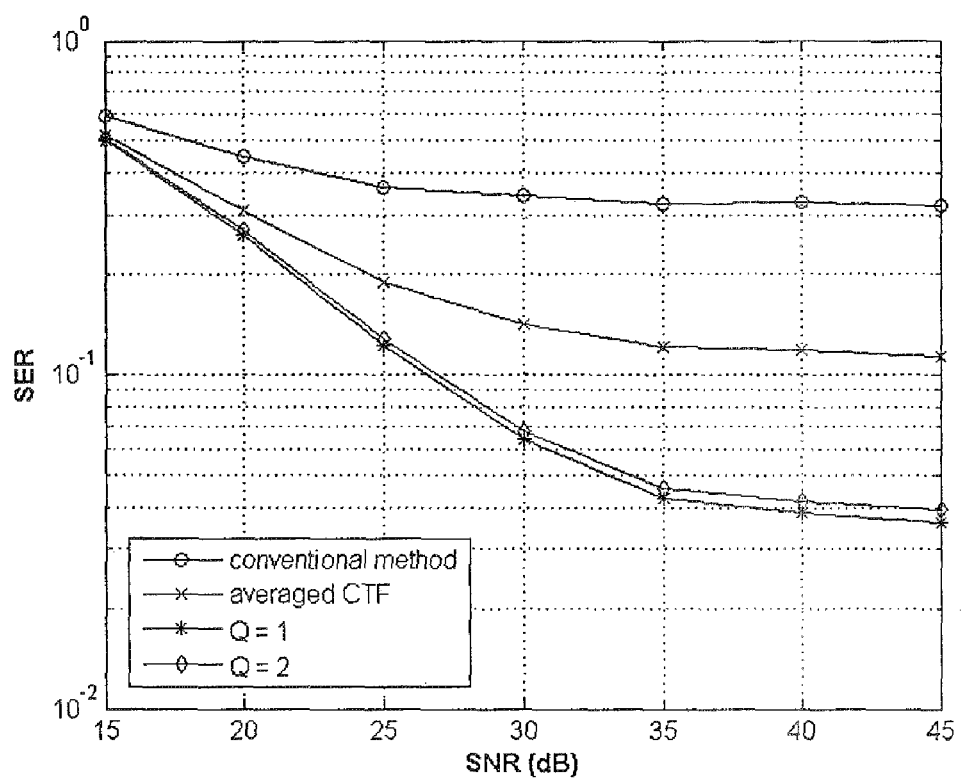
FIG. 7 is a graph illustrating the results of simulating a SER of an equalization apparatus according to some embodiments of the present invention when the Doppler shift frequency is 100 Hz.

FIG. 6 is a graph illustrating the results of simulating a symbol error rate (SER) of an equalization apparatus according to some embodiments of the present invention when a Doppler shift frequency is 60 Hz. FIG. 7 is a graph illustrating the results of simulating a SER of an equalization apparatus according to some embodiments of the present invention when the Doppler shift frequency is 100 Hz. In the simulations, the structure of the TDS-OFDM symbol illustrated in FIG. 2 was used and the lengths of a frame head (guard interval) and an OFDM block were respectively 420 and 3780. In addition a transmitter pulse-shaping filter was a 160-order squared root raised cosine (SRRC) filter with a roll-off factor of 0.05 and 64-quadrature amplitude modulation (QAM) is used for subcarrier modulation. For clarity of the description, FEC and synchronization errors were not considered.

Referring to FIGS. 6 and 7, the averaged CTF method shown presumes Q=0. It can be inferred from the graphs illustrated in FIGS. 6 and 7 that the equalization method performed by the apparatus illustrated in FIG. 4 according to some embodiments of the present invention is much more effective than the conventional equalization method. Further, it can be inferred that the SER can be decreased when Q is increased. However, when Q is greater than 1, the performance is not greatly increased. Accordingly, it can be concluded from the simulation results that Q=1 will typically be sufficient for satisfactory performance.

Referring to FIG. 7, performance obtained at Q=2 is slightly lower than that obtained at Q=1. This indicates that when the Doppler shift is $f_D \leq 100$ Hz higher order equalization does not always provide higher performance due to CIR estimation using linear approximation.

Referring back to FIGS. 1, 4, and 5, during the pre-FFT compensation and the post-FFT compensation, two operations having FFT complexity (e.g., FFT and IFFT operations respectively performed by the second FFT unit 161-1-1 and the IFFT section 161-1-5 illustrated in FIG. 4) are performed in each processor. The FFT complexity is high, and therefore, a method of reducing the FFT complexity using a characteristic of Fourier transform that multiplications in the time and frequency domains are the same as convolutions in the frequency and time domains, respectively, is performed in the apparatus illustrated in FIGS. 8 and 9.

Figure 8:
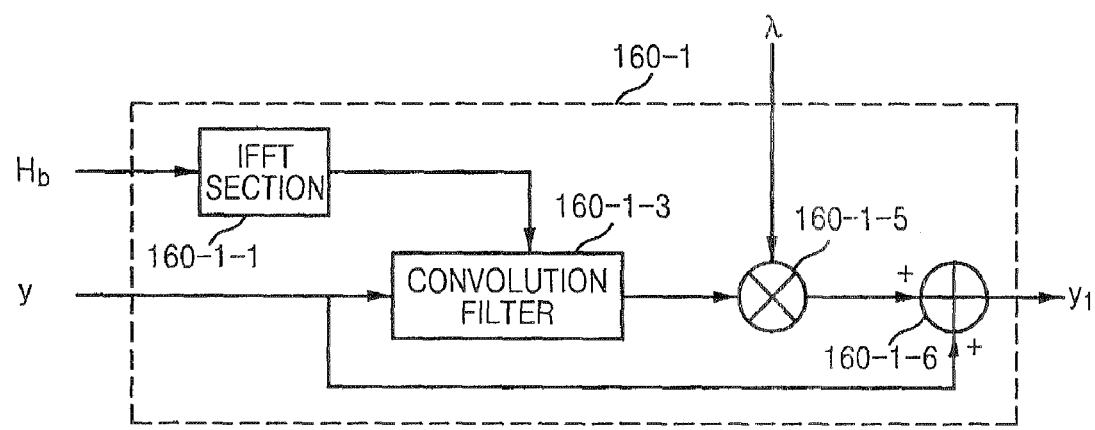
FIG. 8 is a functional block diagram of the pre-FFT unit according to another embodiment of the present invention.

FIG. 8 is a functional block diagram of a pre-FFT unit (160 in FIG. 1) 160-1 according to an alternative embodiment of the present invention. Referring to FIGS. 1 and 8, the pre-FFT unit 160-1 may include an IFFT section 160-1-1, a convolution filter 160-1-3, and one or more operating sections 160-1-5 and 160-1-6.

The IFFT section 160-1-1 performs IFFT of the normalized CTF $H_b$ output from the channel information computing unit 130. The convolution filter 160-1-3 performs convolution filtering of the PN-eliminated signal y output from the PN eliminator 150 using a result of the IFFT of the normalized CTF $H_b$ as a coefficient. In other words, a frequency-domain normalized CTF is converted into a time-domain signal, which is used as a coefficient of the convolution filter 160-1-3. The operating section (multiplier) 160-1-5 multiplies a signal output from the convolution filter 160-1-3 by the CIR slope vector λ and the operating section (adder) 160-1-6 adds the result of the multiplication and the signal y. The result of the operations performed by the one or more operating sections 160-1-5 and 160-1-6 may be output to the first FFT unit 170.

The arrangement of the operating sections 160-1-5 and 160-1-6 illustrated in FIG. 8 is just an exam pie, and any other arrangement of adders and multipliers that can perform the multiplication of the signal output from the convolution filter 160-1-3 and the CIR slope vector λ and addition of the multiplication result and the signal y can be used.

Figure 9:
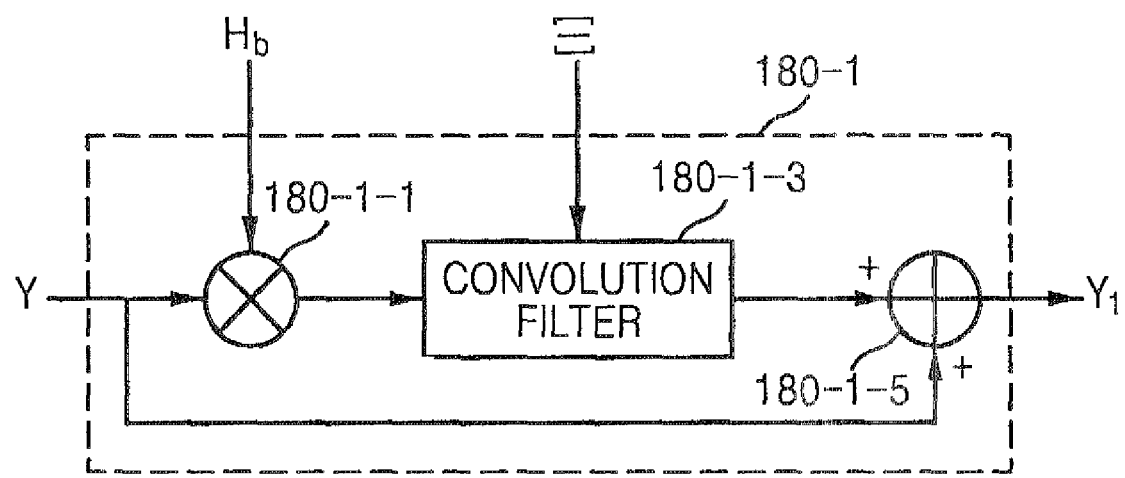
FIG. 9 is a functional block diagram of the post-FFT unit according to some another embodiment of the present invention.

FIG. 9 is a functional block diagram of a post-FFT unit (as 180 in FIG. 1) 180-1 according to an alternative embodiment of the present invention. Referring to FIGS. 1 and 9, the post-FFT unit 180-1 may include a first operating section (multiplier) 180-1-1, a convolution filter 180-1-3, and a second operating section (adder) 180-1-5.

The first operating section (multiplier) 180-1-1 multiplies the fast Fourier transformed signal Y output from the first FFT unit 170 by the normalized CTF $H_b$. The convolution filter 180-1-3 performs convolution filtering of a signal output from the first operating section (adder) 180-1-1 using a signal Ξ, which is a result of performing FFT of the CIR slope vector λ, as a coefficient. The signal Ξ is a vector obtained by performing FFT of the CIR slope vector λ, which is a constant vector. Accordingly, the signal Ξ can be computed in advance and input to the convolution filter 180-1-3. The second operating section (adder) 180-1-5 adds a signal output from the convolution filter 180-1-3 and the fast Fourier transformed signal Y output from the first FFT unit 170. The second operating section (adder) 180-1-5 may output a result of the addition to the equalizer 140 (as illustrated in FIG. 1).

Figure 10:
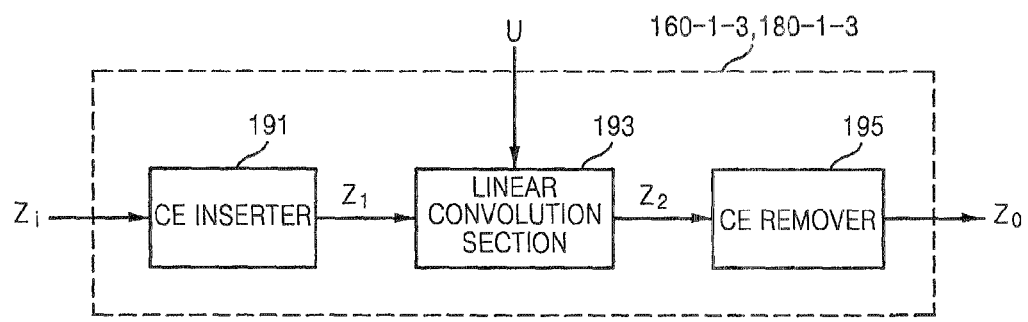
FIG. 10 is a functional block diagram of a convolution filter 160-1-3 or 180-1-3 used in (FIG. 8 and FIG. 9 respectively.

FIG. 10 is a functional block diagram of the convolution filter 160-1-3 (FIG. 8) or 180-1-3 (FIG. 9). Referring to FIGS. 8 through 10, the convolution filter 160-1-3 or 180-1-3 includes a cyclic extension (CE) inserter 191 that inserts a CE into an input signal $Z_i$, a linear convolution section 193 which performs linear convolution of a signal $Z_1$ output from the CE inserter 191 based on an input coefficient U, and a CE remover 195 which removes the CE from a signal $Z_2$ output from the linear convolution section 193.

In the convolution filter 160-1-3 shown in FIG. 8, the input signal is the PN-eliminated signal y output from the PN eliminator 150 (FIG. 1) and the input coefficient is the result of the IFFT of the normalized CTF $H_b$. In the convolution filter 180-1-3 shown in FIG. 9, the input signal is the result of multiplying the fast Fourier transformed signal Y output from the first FFT unit 170 by the normalized CTF $H_b$ and the input coefficient is the signal Ξ corresponding to a result of performing FFT of the CIR slope vector λ.

The convolution filter of FIG. 10 (e.g., 160-1-3 or 180-1-3) is further described with the following details: the input signal is defined as $Z_i = [Z_i[0] \; Z_i[1] \ldots Z_i[N_c-1]]^T$, an output signal is defined as $Z_o = [Z_o[0] \; Z_o[1] \ldots Z_o[N_c-1]]^T$, and the filter coefficient is defined as $U = U = [U[-\kappa/2] \; U[-\kappa/2+1] \ldots U[\kappa/2-1] \; U[\kappa/2]]^T$. In addition, the signal output from the CE inserter 191 is defined as $Z_1 = [Z_1[0] \; Z_1[1] \ldots Z_1[N_c+\kappa-1]]^T$ and the signal output from the linear convolution section 193 is defined as $Z_2 = [Z_2[0] \; Z_2[1] \ldots Z_2[N_c+\kappa-1]]^T$. Here, k is the order of the convolution filter.

The CE inserter 191, the linear convolution section 193 and the CE remover 194 perform operations expressed by Equations 27, 28, and 29, respectively:

$$Z_1[n] = \begin{cases} Z_1[N_c - \kappa + n], & n < \kappa \\ Z_1[n - \kappa], & \kappa \leq n < N_c + \kappa \end{cases} \quad (27)$$

$$Z_2[n] = \sum_{j=-\kappa/2}^{\kappa/2} U[j] Z_1[n-j] \quad (28)$$

$$Z_0[n] = \begin{cases} Z_2[n + \kappa], & 0 \leq n < N_c - \kappa/2 \\ Z_2[n - N_c + \kappa], & N_c - \kappa/2 \leq n < N_c \end{cases} \quad (29)$$

Accordingly, the convolution filter of FIG. 10 (160-1-3 or 180-1-3) performs cyclic convolution using the linear convolution based on the CE. The CE remover 195 may cyclically shift the signal output from the linear convolution section 193 to be inphase with a frequency-domain signal.

Referring to FIG. 8, the pre-FFT unit 160-1 performs IFFT once using the IFFT section 160-1-1 in order to obtain the coefficient for the convolution filter 160-1-3. By contrast, referring to FIG. 9, the post-FET unit 180-1 does not perform an operation having FFT complexity. Since the coefficient of the convolution filter 180-1-3 is a constant vector (since the CIR slope vector λ is a constant vector, the signal Ξ corresponding to a result of performing FFT of the CIR slope vector λ is also a constant vector), the complexity required to perform the post-FFT compensation is dependent on the order k of the convolution filter 180-1-3. In practice, the complexity required for FFT of the CIR slope vector λ is so small that it can be ignored. Consequently, the post-FFT compensation illustrated in FIG. 9 is performed with much lower complexity than the pre-FFT compensation illustrated in FIG. 8.

Referring back to FIG. 1, the FEC unit that may be included in the TDS-OFDM equalization apparatus 100 receives a signal output from the equalizer 140 and performs FEC upon it, whereupon it becomes the output bit stream of the time domain synchronous orthogonal frequency division multiplexing (TDS-OFDM) equalization apparatus of FIG. 1.

Figure 11:
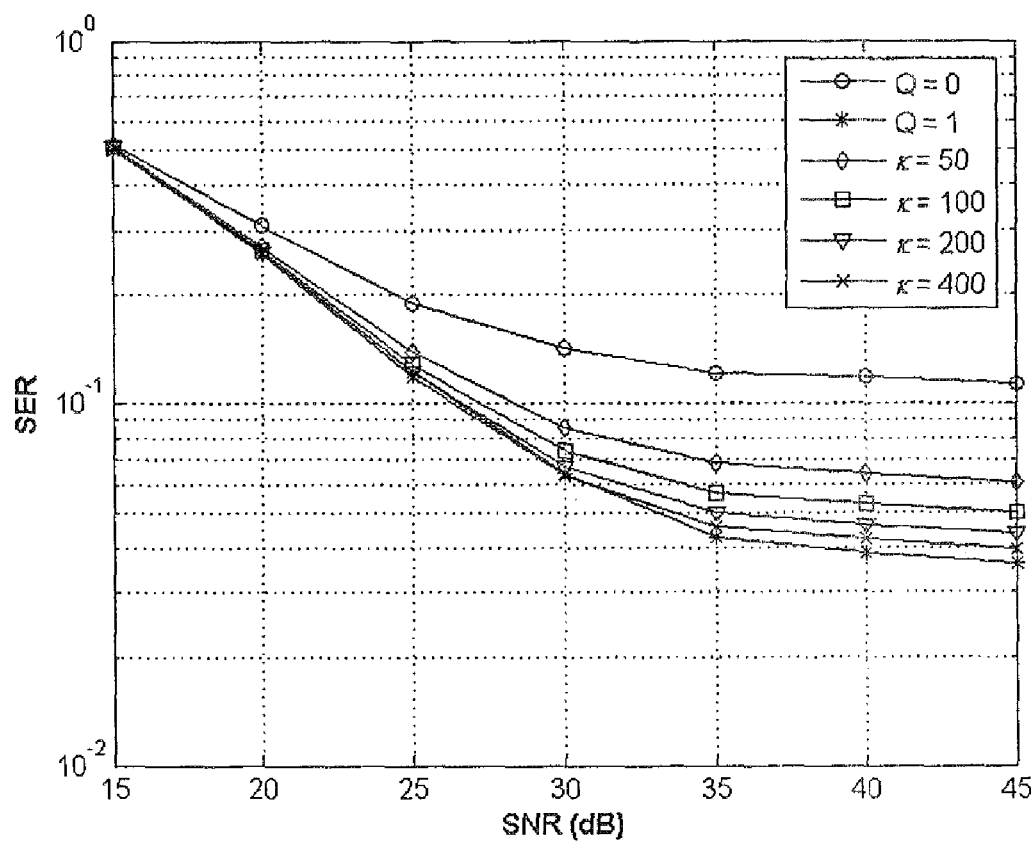
FIG. 11 is a graph illustrating the results of simulating a SER of an equalization apparatus when the Doppler shift frequency is 100 Hz by using the pre-FFT unit illustrated in FIG. 8.
Figure 12:
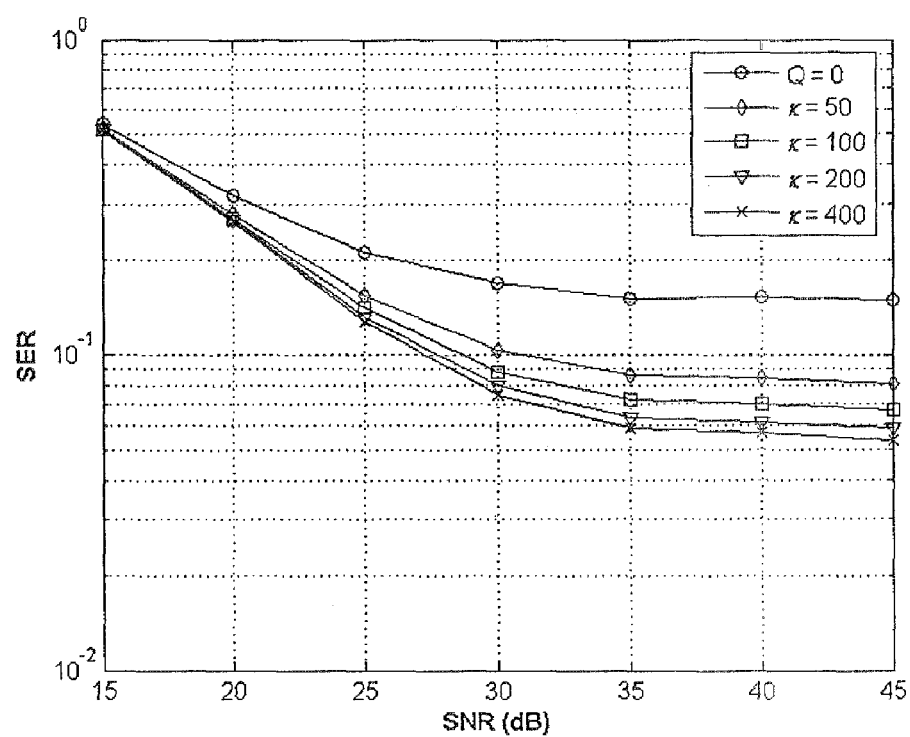
FIG. 12 is a graph illustrating the results of simulating a SER of an equalization apparatus when the Doppler shift frequency is 120 Hz by using the pre-FFT unit illustrated in FIG. 8.

FIG. 11 is a graph illustrating the results of simulating a SER of an equalization apparatus when the Doppler shift frequency is 100 Hz by using the pre-FFT unit 160-1 illustrated in FIG. 8. FIG. 12 is a graph illustrating the results of simulating a SER of an equalization apparatus when the Doppler shift frequency is 120 Hz by using the pre-FFT unit 160-1 illustrated in FIG. 8.

Referring to FIGS. 11 and 12, when the order k of the convolution filter 160-1-3 increases, the SER decreases and equalization performance is close to the performance that was achieved when Q=1 in an equalization apparatus using the method performed in the apparatus illustrated in FIG. 4 or 5. According to the simulation results illustrated in FIGS. 11 and 12, the performance is satisfactorily improved when the order k is at least 50.

Figure 13:
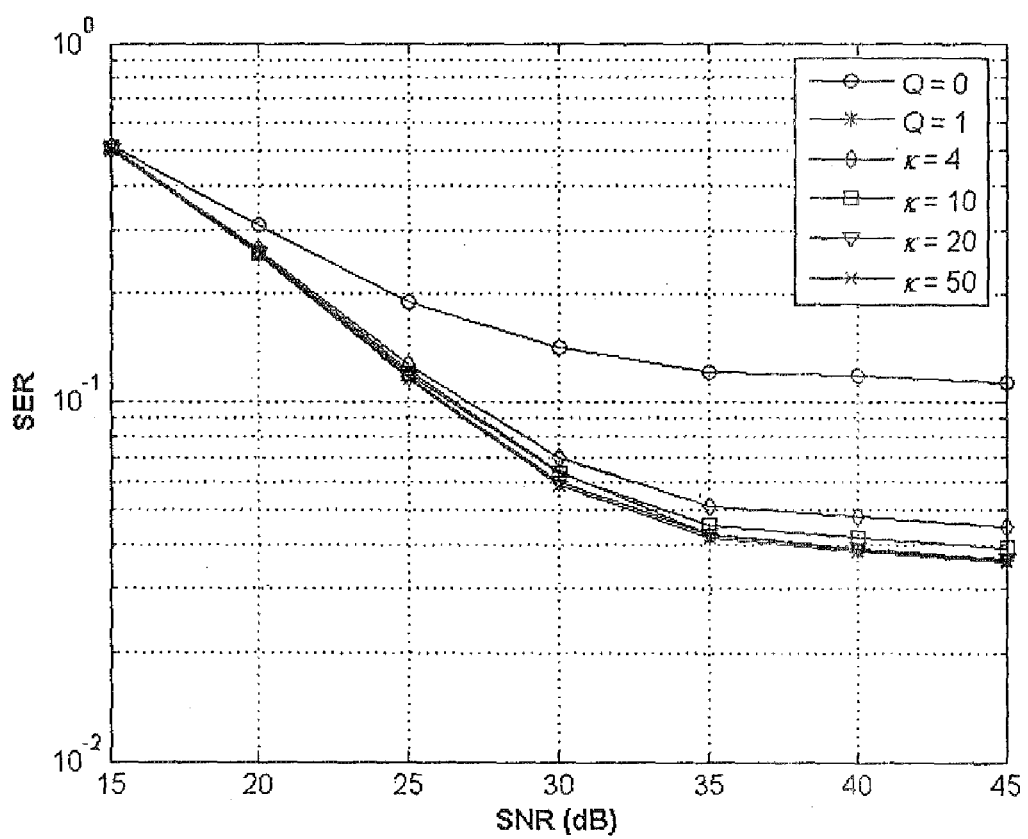
FIG. 13 is a graph illustrating the results of simulating a SER of an equalization apparatus when the Doppler shift frequency is 100 Hz by using the post-FFT unit illustrated in FIG. 9.
Figure 14:
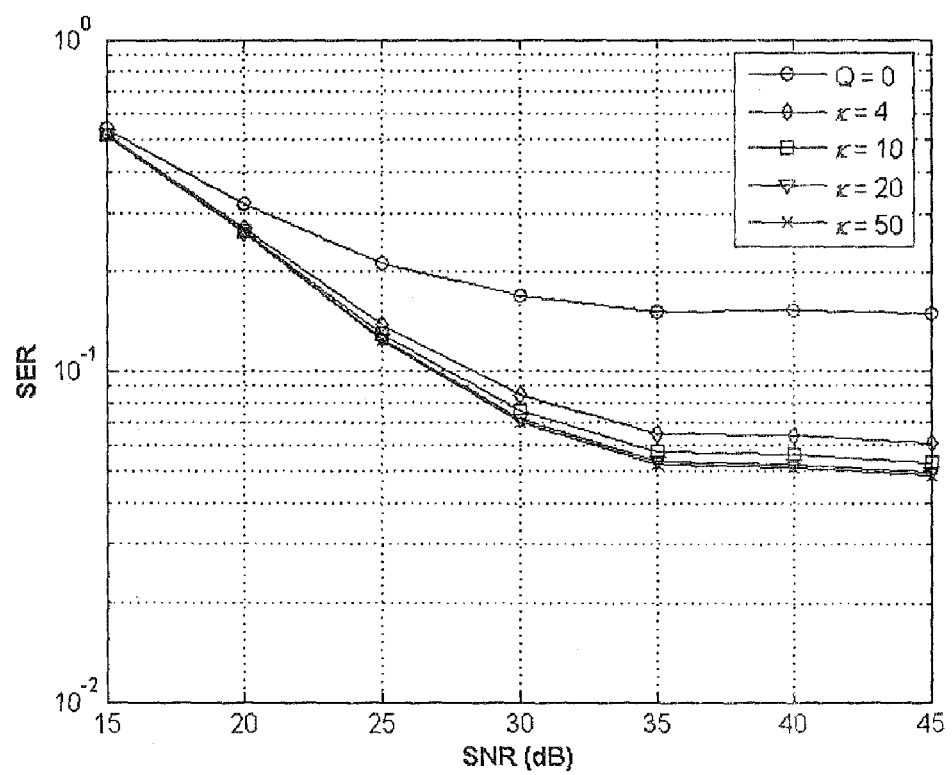
FIG. 14 is a graph illustrating the results of simulating a SER of an equalization apparatus when the Doppler shift frequency is 120 Hz by using the post-FFT unit illustrated in FIG. 9

FIG. 13 is a graph illustrating the results of simulating a SER of an equalization apparatus when the Doppler shift frequency is 100 Hz by using the post-FFT unit 180-1 illustrated in FIG. 9. FIG. 14 is a graph illustrating the results of simulating a SER of an equalization apparatus when the Doppler shift frequency is 120 Hz by using the post-FFT unit 180-1 illustrated in FIG. 9.

Referring to FIGS. 13 and 14, when the order k of the convolution filter 180-1-3 increases the SER remarkably decreases as compared to the time-domain equalization method illustrated in FIGS. 11 and 12. In addition, the performance, which was achieved when Q=1 in the equalization apparatus using the method illustrated in FIG. 4 or 5, can be obtained only with k=20. Even only with k=4, very satisfactory performance can be achieved.

As described above, according to some embodiments of the present invention, the influence of ICI can be mitigated in the time domain and the complexity of equalization can be reduced to o($N_c$). In addition, when a simplified equalization method like one illustrated in FIG. 8 or 9 is used, overhead that may occur during computation at the complexity of o($N_c$) can also be reduced. In particular, when the equalization method of the circuits illustrated in FIG. 9 is used, performance remarkably increases in a mobile environment. While the equalization method performed in the circuits illustrated in FIG. 4 or 5, which performs at least a single operation of FFT and IFFT has a complexity of at least $2N_c \log_2 N_c$, the equalization method of the circuit illustrated in FIG. 9 can decrease the complexity to about $N_c \kappa/2$ since an operation, i.e., FFT or IFFT having a relatively high complexity is not required.

While the present invention has been shown and described with reference to exemplary embodiments thereof, it will be understood by those of ordinary skill in the art that various changes in form and detail may be made herein without departing from the spirit and scope of the present invention, as defined by the following claims.

What is claimed is:

1. An equalization method for a time domain synchronous orthogonal frequency division multiplexing (TDS-OFDM) receiver, the equalization method comprising:

estimating a channel impulse response (CIR) based on a baseband sampled complex signal and locally stored pseudo-noise;

computing channel information including first channel information and second channel information based on the estimated CIR;

performing pre-fast Fourier transform (FFT) compensation of a pseudo-noise eliminated signal y, which is obtained by eliminating the pseudo-noise from the baseband sampled complex signal based on the CIR, based on the first channel information;

performing FFT of a pre-FFT compensated signal; and equalizing a fast Fourier transformed signal Y based on the second channel information.

2. The equalization method of claim 1, wherein the first channel information is a normalized channel transfer function $H_b$ and the second channel information is an average channel transfer function $H_a$.

3. The equalization method of claim 2, wherein computing the channel information comprises:

padding zeros to the CIR and performing FFT of a zero-padded CIR vector; and computing the second channel information using $$H_a = \frac{1}{2}(\hat{H}_n + \hat{H}_c),$$

where $\hat{H}_n$ is a fast Fourier transformed CIR vector and $\hat{H}_c$ is a vector obtained by delaying the fast Fourier transformed CIR vector $\hat{H}_n$ by a single OFDM symbol period.

4. The equalization method of claim 3, wherein computing the channel information further comprises:

computing a channel transfer function deviation vector using $$H_d = \frac{1}{2}(\hat{H}_n - \hat{H}_c);$$

and computing a vector of the normalized channel transfer function $H_b$ corresponding to the first channel information using $H_b[k]=H_d[k]/H_a[k]$.

5. The equalization method of claim 1, wherein estimating the CIR comprises estimating the CIR using linear approximation based on at least two gain values.

6. The equalization method of claim 5, wherein two of the at least two gain values respectively correspond to the centers of two respective guard intervals adjacent to an OFDM block.

7. The equalization method of claim 1, wherein performing the pre-FFT compensation comprises:

performing Q time time-frequency-time (T-F-T) processes where Q is 0 or an integer greater than 0; and adding the pseudo-noise eliminated signal y and each result of the respective Q time T-F-T processes.

8. The equalization method of claim 7, wherein performing each T-F-T process comprises:

performing FFT of a input signal;

multiplying a result of performing the FFT of the input signal by a normalized channel transfer function $H_b$;

performing inverse FFT (IFFT) of a result of the multiplication; and outputting a output signal by multiplying a result of the IFFT by a CIR slope vector $\lambda$, where the input signal of first T-F-T process is the pseudo-noise eliminated signal y and the input signal of N-th T-F-T process is the output signal of (N−1)-th T-F-T process, where N is integer greater than 0 and no greater than Q when Q is greater than 0.

9. The equalization method of claim 7, further comprising performing post-FET compensation of the fast Fourier transformed signal Y when Q is 0, wherein equalizing the fast Fourier transformed signal Y comprises equalizing the result of the post-FFT compensation based on the second channel information.

10. The equalization method of claim 9, wherein performing the post-FET compensation comprises:
   multiplying the fast Fourier transformed signal Y by the normalized channel transfer function $H_b$;
   performing convolution filtering of the result of the multiplication of the signal Y and the function $H_b$ using a signal $\Xi$, which is a result of performing FFT of a CIR slope vector $\lambda$, as a coefficient; and
   adding the result of the convolution filtering and the fast Fourier transformed signal Y.

11. The equalization method of claim 1, wherein performing the pre-FFT compensation comprises:
   performing inverse FFT (IFFT) of a normalized channel transfer function $H_b$; performing convolution filtering of the pseudo-noise eliminated signal y using the normalized channel transfer function $H_b$ as a coefficient; and
   multiplying the result of the convolution filtering by a CIR slope vector $\lambda$ and adding the result of the multiplication and the pseudo-noise eliminated signal y.

12. The equalization method of claim 11, wherein performing the convolution filtering comprises:
   inserting a cyclic extension (CE) into an input signal;
   performing linear convolution of a CE inserted signal based on the coefficient; and
   removing the CE from the result of the linear convolution.

13. The equalization method of claim 12, wherein performing the convolution filtering further comprises cyclically shifting the result of the linear convolution to correct a phase of the result of the linear convolution according to a phase of a frequency-domain signal.

14. A time domain synchronous orthogonal frequency division multiplexing (TDS-OFDM) equalization apparatus comprising:
   a correlator configured to compute a correlation signal based on a baseband sampled complex signal and locally stored pseudo-noise and to output the correlation signal;
   a channel impulse response (CIR) estimation unit configured to estimate a CIR based on the correlation signal output from the correlator;
   a channel information computing unit configured to compute channel information including first channel information and second channel information from an estimated CIR output from the CIR estimation unit;
   a pre-fast Fourier transform (FFT) unit configured to perform pre-FFT compensation of a pseudo-noise eliminated signal y, obtained by eliminating the pseudo-noise from the baseband sampled complex signal based on the CIR output from the CIR estimation unit, based on the first channel information output from the channel information computing unit;
   a first FFT unit configured to perform FFT of a pre-FFT compensated signal output from the pre-FFT unit; and
   an equalizer configured to equalize a fast Fourier transformed signal Y, which is output from the first FFT unit, based on the second channel information output from the channel information computing unit.

15. The TDS-OFDM equalization apparatus of claim 14, further comprising a pseudo-noise eliminator configured to output the pseudo-noise eliminated signal y to the pre-FFT unit based on the baseband sampled complex signal and the CIR output from the CIR estimation unit.

16. The TDS-OFDM equalization apparatus of claim 14, wherein the channel information computing unit comprises:
   a pad zero/FFT section configured to pad zeros to the CIR output from the CIR estimation unit and to perform FFT of a zero-padded CIR vector;
   a delay section configured to delay a fast Fourier transformed CIR vector $\hat{H}_n$ output from the pad zero/FFT section by a single OFDM symbol period and to output a delayed vector $\hat{H}_c$; and
   at least one first operation section configured to compute $$H_a = \frac{1}{2}(\hat{H}_n + \hat{H}_c),$$

$$H_d = \frac{1}{2}(\hat{H}_n - \hat{H}_c),$$

and $H_b[k]=H_d[k]/H_a[k]$ based on the vectors $\hat{H}_n$ and $\hat{H}_c$.

17. The TDS-OFDM equalization apparatus of claim 14, wherein the CIR estimation unit receives the correlation signal output from the correlator and estimates the CIR using linear approximation based on the correlation signal and at least two gain values.

18. The TDS-OFDM equalization apparatus of claim 17, wherein two of the at least two gain values respectively correspond to centers of two respective guard intervals adjacent to an OFDM block.

19. The TDS-OFDM equalization apparatus of claim 15, wherein the pre-FFT unit comprises:
   at least one time-frequency-time (T-F-T) processor; and
   an adder configured to add the pseudo-noise eliminated signal y output from the pseudo-noise eliminator and a signal output from the at least one T-F-T processor.

20. The TDS-OFDM equalization apparatus of claim 19, wherein the at least one T-F-T processor comprises:
   a second FFT unit configured to perform FFT of an input signal;
   a first multiplier configured to multiply a fast Fourier transformed signal output from the second FFT unit by the first channel information output from the channel information computing unit;
   an inverse FFT (IFFT) unit configured to perform IFFT of the result of the multiplication; and
   a second multiplier configured to multiply an inverse fast Fourier transformed signal by a CIR slope vector $\lambda$.

21. The TDS-OFDM equalization apparatus of claim 15, wherein the pre-FFT unit comprises:
   an IFFT section configured to perform IFFT of a normalized channel transfer function $H_b$ output from the channel information computing unit;
   a convolution filter configured to perform convolution filtering of the pseudo-noise eliminated signal y output from the pseudo-noise eliminator using an inverse fast Fourier converted $H_b$ as a coefficient; and
   at least one operating section configured to multiply a signal output from the convolution filter by a CIR slope vector $\lambda$ and to add the result of the multiplication and the pseudo-noise eliminated signal y.

22. The TDS-OFDM equalization apparatus of claim 14, further comprising a post-FFT unit configured to perform post-FFT compensation of the fast Fourier transformed signal Y output from the first FFT unit, wherein the equalizer equalizes a signal output from the post-FFT unit based on the second channel information.

23. The TDS-OFDM equalization apparatus of claim 22, wherein the post-FFT unit comprises:
    a multiplier configured to multiply the fast Fourier transformed signal Y output from the first FFT unit by a normalized channel transfer function $H_b$;
    a convolution filter configured to perform convolution filtering of a signal output from the multiplier using a signal $\Xi$, which is the result of performing FFT of a CIR slope vector $\lambda$, as a coefficient; and
    an adder configured to add a signal output from the convolution filter and the fast Fourier transformed signal Y output from the first FFT unit.

24. The TDS-OFDM equalization apparatus of claim 21, wherein the convolution filter comprises:
    a cyclic extension (CE) inserter configured to insert a CE into an input signal;
    a linear convolution section configured to perform linear convolution of a CE inserted signal output from the CE inserter based on the coefficient; and
    a CE remover configured to remove the CE from a signal output from the linear convolution section.

25. The TDS-OFDM equalization apparatus of claim 24, wherein the CE remover cyclically shifts the signal output from the linear convolution section to correct a phase of the signal output from the linear convolution section according to a phase of a frequency-domain signal.

26. The TDS-OFDM equalization apparatus of claim 14, wherein the TDS-OFDM equalization apparatus is comprised in a TDS-OFDM receiver.

27. A time domain synchronous orthogonal frequency division multiplexing (TDS-OFDM) equalization apparatus comprising:
    a correlator configured to compute a correlation signal indicating the correlation between a baseband-sampled complex signal and locally stored pseudo-noise and to output the correlation signal;
    a channel impulse response (CIR) estimation unit configured to estimate a CIR based on the correlation signal output from the correlator;
    a channel information computing unit configured to compute channel information from the estimated CIR output from the CIR estimation unit, wherein the channel information computing unit comprises:
        a pad zero/FFT section configured to pad zeros to the CIR output from the CIR estimation unit and to perform FFT of a zero-padded CIR vector;
        a delay section configured to delay a fast Fourier transformed CIR vector $\hat{H}_n$ output from the pad zero/FFT section by a single OFDM symbol period and to output a delayed vector $\hat{H}_c$; and
        at least one first operation section configured to compute $$H_a = \frac{1}{2}(\hat{H}_n + \hat{H}_c),$$
$$H_d = \frac{1}{2}(\hat{H}_n - \hat{H}_c),$$

and $H_b[k] = H_d[k]/H_a[k]$ based on the vectors $\hat{H}_n$ and $\hat{H}_c$.

28. The TDS-OFDM equalization apparatus of claim 27, further comprising:
    a pre-fast Fourier transform (FFT) unit configured to perform pre-FFT compensation of a pseudo-noise eliminated signal y, which is obtained by eliminating the pseudo-noise from the baseband sampled complex signal based on the CIR output from the CIR estimation unit, based on first channel information output from the channel information computing unit;
    a first FFT unit configured to perform FFT of a pre-FFT compensated signal output from the pre-FFT unit; and
    an equalizer configured to equalize a fast Fourier transformed signal Y, which is output from the first FFT unit, based on second channel information output from the channel information computing unit.

* * * * *